(12) United States Patent
Urmson et al.

(10) Patent No.: US 8,965,621 B1
(45) Date of Patent: *Feb. 24, 2015

(54) DRIVING PATTERN RECOGNITION AND SAFETY CONTROL

(71) Applicant: Google Inc., Mountain View, CA (US)

(72) Inventors: Christopher Paul Urmson, Mountain View, CA (US); Dmitri A. Dolgov, Mountain View, CA (US); Philip Nemec, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/134,221

(22) Filed: Dec. 19, 2013

Related U.S. Application Data

(63) Continuation of application No. 13/248,582, filed on Sep. 29, 2011, now Pat. No. 8,634,980.

(60) Provisional application No. 61/391,271, filed on Oct. 8, 2010, provisional application No. 61/390,094, filed on Oct. 5, 2010.

(51) Int. Cl.
  *G05D 1/00* (2006.01)
(52) U.S. Cl.
  CPC .................................. *G05D 1/0055* (2013.01)
  USPC .......................................................... 701/23
(58) Field of Classification Search
  USPC .......................................................... 701/23
  See application file for complete search history.

(56) References Cited

U.S. PATENT DOCUMENTS

| 1,924,984 A | 8/1933 | Fageol |
| 3,186,508 A | 6/1965 | Lamont |
| 3,324,805 A | 6/1967 | Mulch |
| 3,596,728 A | 8/1971 | Neville |
| 4,372,414 A | 2/1983 | Anderson et al. |
| 4,387,783 A | 6/1983 | Carman |
| 4,656,834 A | 4/1987 | Elpern |
| 4,924,795 A | 5/1990 | Ottemann |
| 4,970,653 A | 11/1990 | Kenue |

(Continued)

FOREIGN PATENT DOCUMENTS

| EP | 0884666 A1 | 12/1998 |
| EP | 2216225 A1 | 8/2010 |

(Continued)

OTHER PUBLICATIONS

"Fact Sheet: Beyond Traffic Signals: A Paradigm Shift Intersection Control for Autonomous Vehicles", [online]. [Retrieved Apr. 27, 2011]. Retrieved from the internet: <http://www.fhwa.dot.gov/advancedresearch/pubs/10023/index.cfm>, 3 pages.

(Continued)

*Primary Examiner* — Mary Cheung
*Assistant Examiner* — Anne Mazzara
(74) *Attorney, Agent, or Firm* — Lerner, David, Littenberg, Krumholz & Mentlik, LLP

(57) ABSTRACT

Systems and methods are provided for controlling a vehicle. A safe envelope driving pattern is determined to control the vehicle in an autonomous mode. User identification data and sensor data are received from one or more sensors associated with the vehicle. A driver-specific driving pattern is determined based on the received sensor data and the user identification data. Operation of the vehicle is controlled in the autonomous mode based on the identification of the user in the driver's seat, the safe envelope driving pattern, and the user-specific driving pattern.

20 Claims, 5 Drawing Sheets

(56) References Cited

U.S. PATENT DOCUMENTS

| | | | |
|---|---|---|---|
| 4,982,072 A | 1/1991 | Takigami |
| 5,187,666 A | 2/1993 | Watanabe |
| 5,415,468 A | 5/1995 | Latarnik et al. |
| 5,448,487 A | 9/1995 | Arai |
| 5,470,134 A | 11/1995 | Toepfer et al. |
| 5,684,696 A | 11/1997 | Rao et al. |
| 5,774,069 A | 6/1998 | Tanaka et al. |
| 5,790,403 A | 8/1998 | Nakayama |
| 5,906,645 A | 5/1999 | Kagawa et al. |
| 5,913,376 A | 6/1999 | Takei |
| 6,064,926 A | 5/2000 | Sarangapani et al. |
| 6,070,682 A | 6/2000 | Isogai et al. |
| 6,151,539 A | 11/2000 | Bergholz et al. |
| 6,195,610 B1 | 2/2001 | Kaneko |
| 6,321,147 B1 | 11/2001 | Takeda et al. |
| 6,332,354 B1 | 12/2001 | Lalor |
| 6,343,247 B2 | 1/2002 | Jitsukata et al. |
| 6,385,539 B1 | 5/2002 | Wilson et al. |
| 6,438,472 B1 | 8/2002 | Tano et al. |
| 6,438,491 B1 | 8/2002 | Farmer |
| 6,470,874 B1 | 10/2002 | Mertes |
| 6,504,259 B1 | 1/2003 | Kuroda et al. |
| 6,516,262 B2 | 2/2003 | Takenaga et al. |
| 6,591,172 B2 | 7/2003 | Oda et al. |
| 6,643,576 B1 | 11/2003 | O Connor et al. |
| 6,832,156 B2 | 12/2004 | Farmer |
| 6,836,719 B2 | 12/2004 | Andersson et al. |
| 6,847,869 B2 | 1/2005 | Dewberry et al. |
| 6,862,524 B1 | 3/2005 | Nagda et al. |
| 6,876,908 B2 | 4/2005 | Cramer et al. |
| 6,934,613 B2 | 8/2005 | Yun |
| 7,011,186 B2 | 3/2006 | Frentz et al. |
| 7,031,829 B2 | 4/2006 | Nisiyama |
| 7,102,496 B1 | 9/2006 | Ernst, Jr. et al. |
| 7,177,760 B2 | 2/2007 | Kudo |
| 7,194,347 B2 | 3/2007 | Harumoto et al. |
| 7,207,304 B2 | 4/2007 | Iwatsuki et al. |
| 7,233,861 B2 | 6/2007 | Van Buer et al. |
| 7,327,242 B2 | 2/2008 | Holloway et al. |
| 7,346,439 B2 | 3/2008 | Bodin |
| 7,394,046 B2 | 7/2008 | Olsson et al. |
| 7,486,802 B2 | 2/2009 | Hougen |
| 7,499,774 B2 | 3/2009 | Barrett et al. |
| 7,499,776 B2 | 3/2009 | Allard et al. |
| 7,499,804 B2 | 3/2009 | Svendsen et al. |
| 7,515,101 B1 | 4/2009 | Bhogal et al. |
| 7,565,241 B2 | 7/2009 | Tauchi |
| 7,579,942 B2 | 8/2009 | Kalik |
| 7,656,280 B2 | 2/2010 | Hines et al. |
| 7,694,555 B2 | 4/2010 | Howell et al. |
| 7,778,759 B2 | 8/2010 | Tange et al. |
| 7,818,124 B2 | 10/2010 | Herbst et al. |
| 7,865,277 B1 | 1/2011 | Larson et al. |
| 7,894,951 B2 | 2/2011 | Norris et al. |
| 7,908,040 B2 | 3/2011 | Howard et al. |
| 7,956,730 B2 | 6/2011 | White et al. |
| 7,979,175 B2 | 7/2011 | Allard et al. |
| 8,050,863 B2 | 11/2011 | Trepagnier et al. |
| 8,078,349 B1 | 12/2011 | Prada Gomez et al. |
| 8,126,642 B2 | 2/2012 | Trepagnier et al. |
| 8,190,322 B2 | 5/2012 | Lin et al. |
| 8,195,341 B2 | 6/2012 | Huang et al. |
| 8,244,408 B2 | 8/2012 | Lee et al. |
| 8,260,515 B2 | 9/2012 | Huang et al. |
| 8,280,601 B2 | 10/2012 | Huang et al. |
| 8,280,623 B2 | 10/2012 | Trepagnier et al. |
| 8,352,111 B2 | 1/2013 | Mudalige |
| 8,352,112 B2 | 1/2013 | Mudalige |
| 8,412,449 B2 | 4/2013 | Trepagnier et al. |
| 8,452,506 B2 | 5/2013 | Groult |
| 8,706,394 B2 | 4/2014 | Trepagnier et al. |
| 2001/0037927 A1 | 11/2001 | Nagler et al. |
| 2003/0016804 A1 | 1/2003 | Sheha et al. |
| 2003/0055554 A1 | 3/2003 | Shioda et al. |
| 2003/0093209 A1 | 5/2003 | Andersson et al. |
| 2004/0243292 A1 | 12/2004 | Roy |
| 2005/0012589 A1 | 1/2005 | Kokubu et al. |
| 2005/0125154 A1 | 6/2005 | Kawasaki |
| 2005/0149251 A1 | 7/2005 | Donath et al. |
| 2005/0273251 A1 | 12/2005 | Nix et al. |
| 2006/0037573 A1 | 2/2006 | Iwatsuki et al. |
| 2006/0082437 A1 | 4/2006 | Yuhara |
| 2006/0089764 A1 | 4/2006 | Filippov et al. |
| 2006/0089800 A1 | 4/2006 | Svendsen et al. |
| 2006/0178240 A1 | 8/2006 | Hansel |
| 2006/0276942 A1 | 12/2006 | Anderson et al. |
| 2007/0165910 A1 | 7/2007 | Nagaoka et al. |
| 2007/0225909 A1 | 9/2007 | Sakano |
| 2007/0239331 A1 | 10/2007 | Kaplan |
| 2007/0247281 A1 | 10/2007 | Shimomura |
| 2008/0021628 A1 | 1/2008 | Tryon |
| 2008/0039991 A1 | 2/2008 | May et al. |
| 2008/0059015 A1 | 3/2008 | Whittaker et al. |
| 2008/0059048 A1 | 3/2008 | Kessler et al. |
| 2008/0084283 A1 | 4/2008 | Kalik |
| 2008/0120025 A1 | 5/2008 | Naitou et al. |
| 2008/0120171 A1 | 5/2008 | Ikeuchi et al. |
| 2008/0147253 A1 | 6/2008 | Breed |
| 2008/0161987 A1 | 7/2008 | Breed |
| 2008/0167771 A1 | 7/2008 | Whittaker et al. |
| 2008/0183512 A1 | 7/2008 | Benzinger et al. |
| 2008/0188246 A1 | 8/2008 | Sheha et al. |
| 2008/0195268 A1 | 8/2008 | Sapilewski et al. |
| 2008/0277183 A1 | 11/2008 | Huang et al. |
| 2008/0303696 A1 | 12/2008 | Aso et al. |
| 2008/0306969 A1 | 12/2008 | Mehta et al. |
| 2009/0005959 A1 | 1/2009 | Bargman et al. |
| 2009/0082879 A1 | 3/2009 | Dooley et al. |
| 2009/0115594 A1 | 5/2009 | Han |
| 2009/0198400 A1 | 8/2009 | Allard et al. |
| 2009/0248231 A1 | 10/2009 | Kamiya |
| 2009/0276154 A1 | 11/2009 | Subramanian et al. |
| 2009/0287367 A1 | 11/2009 | Salinger |
| 2009/0287368 A1 | 11/2009 | Bonne |
| 2009/0306834 A1 | 12/2009 | Hjelm et al. |
| 2009/0319096 A1 | 12/2009 | Offer et al. |
| 2009/0319112 A1 | 12/2009 | Fregene et al. |
| 2009/0326799 A1 | 12/2009 | Crook |
| 2010/0017056 A1 | 1/2010 | Asakura et al. |
| 2010/0052945 A1 | 3/2010 | Breed |
| 2010/0066587 A1 | 3/2010 | Yamauchi et al. |
| 2010/0076640 A1 | 3/2010 | Maekawa et al. |
| 2010/0079590 A1 | 4/2010 | Kuehnle et al. |
| 2010/0179720 A1 | 7/2010 | Lin et al. |
| 2010/0191433 A1 | 7/2010 | Groult |
| 2010/0205132 A1 | 8/2010 | Taguchi |
| 2010/0228419 A1 | 9/2010 | Lee et al. |
| 2010/0241297 A1 | 9/2010 | Aoki et al. |
| 2010/0253542 A1 | 10/2010 | Seder et al. |
| 2010/0256836 A1 | 10/2010 | Mudalige |
| 2011/0071718 A1 | 3/2011 | Norris et al. |
| 2011/0137520 A1 | 6/2011 | Rector et al. |
| 2011/0150348 A1 | 6/2011 | Anderson |
| 2011/0206273 A1 | 8/2011 | Plagemann et al. |
| 2011/0246156 A1 | 10/2011 | Zecha et al. |
| 2011/0254655 A1 | 10/2011 | Maalouf et al. |
| 2012/0053775 A1 | 3/2012 | Nettleton et al. |
| 2012/0114178 A1 | 5/2012 | Platonov et al. |
| 2012/0157052 A1 | 6/2012 | Quade |
| 2012/0277947 A1 | 11/2012 | Boehringer et al. |
| 2013/0054049 A1 | 2/2013 | Uno |
| 2013/0054106 A1 | 2/2013 | Schmudderich et al. |
| 2013/0179382 A1 | 7/2013 | Fritsch et al. |

FOREIGN PATENT DOCUMENTS

| | | |
|---|---|---|
| JP | 09-160643 A | 6/1997 |
| JP | 11282530 A | 10/1999 |
| JP | 2000149188 A | 5/2000 |
| JP | 2000305625 A | 11/2000 |
| JP | 2000-338008 A | 12/2000 |
| JP | 2001-101599 A | 4/2001 |
| JP | 2002236993 A | 8/2002 |
| JP | 2002251690 A | 9/2002 |

(56) References Cited

FOREIGN PATENT DOCUMENTS

| | | | |
|---|---|---|---|
| JP | 2003081039 A | 3/2003 |
| JP | 2003162799 A | 6/2003 |
| JP | 2005067483 A | 3/2005 |
| JP | 2005071114 A | 3/2005 |
| JP | 2005-339181 A | 12/2005 |
| JP | 2006322752 A | 11/2006 |
| JP | 2007001475 A | 1/2007 |
| JP | 2008117082 A | 5/2008 |
| JP | 2008152655 A | 7/2008 |
| JP | 2008170404 A | 7/2008 |
| JP | 2008290680 A | 12/2008 |
| JP | 2009053925 A | 3/2009 |
| WO | 0070941 A1 | 11/2000 |
| WO | 0188827 A1 | 11/2001 |
| WO | 2009028558 A1 | 3/2009 |
| WO | 2009155228 A1 | 12/2009 |
| WO | 2011021046 A1 | 2/2011 |

OTHER PUBLICATIONS

"Google Cars Drive Themselves, in Traffic" [online]. [Retrieved Aug. 19, 2011] Retrieved from the internet: <http://www.nytimes.com/2010/10/10/science/10google.html>, 4 pages.

Carl Crane, David Armstrong, Antonio Arroyo, Antoin Baker, Doug Dankel, Greg Garcia, Nicholas Johnson, Jaesang Lee, Shannon Ridgeway, Eric Schwartz, Eric Thorn, Steve Velat, and Ji Hyun Yoon, Team Gator Nation's Autonomous Vehicle Development for the 2007 DARPA Urban Challenge, Dec. 2007, 27 pages.

International Search Report and the Written Opinion for Application No. PCT/US 2011/054154, Apr. 24, 2012.

International Search Report and the Written Opinion for Application No. PCT/US 2011/054896, Apr. 25, 2012.

International Search Report and Written Opinion for Application No. PCT/US2011/054899 dated May 4, 2012.

Martin Schonhof, Martin Treiber, Arne Kesting, and Dirk Helbing, Autonomous Detection and Anticipation of Jam Fronts From Messages Propagated by Intervehicle Communication, 2007, pp. 3-12.

Vincenzo DiLecce and Marco Calabrese, Experimental System to Support Real-Time Driving Pattern Recognition, 2008, pp. 1192-1199.

Eric Guizzo, How's Google's Self-Driving Car Works, IEEE. Org, IEEE, Oct. 18, 2011, pp. 1/31/-31/31.

International Search Report and Written Opinion for Application No. PCT/US2013/061604 dated Jul. 3, 2014.

Matthew McNaughton, Motion Planning for Autonomous Driving with a Conformal Spatiotempral Lattice, Internation Conference on Robotics and Automation, May 9-13, pp. 4889-4895.

DRIVING PATTERN RECOGNITION AND SAFETY CONTROL

CROSS-REFERENCE TO RELATED APPLICATIONS

The present application is a continuation of U.S. patent application Ser. No. 13/248,582 filed Sep. 29, 2011, which claims the benefit of the filing dates of U.S. Provisional Application No. 61/390,094, entitled "AUTONOMOUS VEHICLES," filed Oct. 5, 2010, and U.S. Provisional Application No. 61/391,271, entitled "AUTONOMOUS VEHICLES," filed Oct. 8, 2010, the entire disclosures of which are hereby incorporated herein by reference.

BACKGROUND

The present disclosure relates generally to safe and effective use of autonomous vehicles. More particularly, aspects of the disclosure relate to learning a driver's driving behavior and controlling the autonomous driving mode based on the learned behavior and predetermined safe driving patterns.

Autonomous vehicles may be configured to be driven in a manual mode (where the operator exercises a high degree of control over the movement of the vehicle) or in an autonomous mode (where the vehicle essentially drives itself). These vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode to an autonomous mode and to other modes that lie somewhere in between.

A vehicle with autonomous driving capability may be adapted to recognize the type of driver, such as a teenage driver or an older driver, and modify the driving parameters in response to the recognition. For example, driving speed may be limited for a teenage driver and less jerky movements may be obtained by the autonomous vehicle for an older driver.

SUMMARY

Aspects of the disclosure provide systems and methods for determining a driver-specific driving pattern and controlling an autonomous vehicle based on the driver-specific pattern and a predetermined safe envelope driving pattern. By learning a specific driver's driving behavior and adapting an autonomous driving mode to the driver's style, an autonomous vehicle may be configured with some general safe envelope driving patterns. The adaptive autonomous driving allows the vehicle to perform autonomous driving within the general safe envelope but still safely in the driver's preferred style of driving.

The autonomous vehicle may monitor the vehicle's movement, and collect data such as speed, lane changes, and changes in space between vehicles in front of and behind the driver. The vehicle may also collect data such as (but not limited to) gas usage and application of throttles/brakes. Various driver preferences may also be recorded or derived from the collected data. Driver preferences may include a preference of windy roads over straight roads, right turns over left turns, multi-lane highways over side roads, etc. From data collected over time, the vehicle may learn the driver's driving pattern and gauge driver preferences. Various machine learning algorithms may be used to facilitate the learning process. The learning period may depend on various factors such as the specific driving feature that the vehicle tries to learn (e.g., it may take a shorter time to learn a preferred speed of acceleration than a preference of multi-lane highways over side roads).

When the vehicle learns the driving patterns, the vehicle may perform driver-specific autonomous driving when it identifies which driver is currently in the driver's seat (e.g., changing lanes more often to move faster for driver A than for driver B, selecting a route with more windy roads for driver C, and selecting a route with more straight roads for driver D). The machine-learned driving pattern may be manually interrupted by the driver when desired.

The data may be collected by various types of sensor systems on the vehicle. These sensor systems may include GPS, inertial sensors, lasers, radar, sonar, and acoustic sensors. Other feedback signals, such as wheel speeds and throttle/brake pressure, may also be read from the vehicle. Data processing may take place at the vehicle or transmitted external to the vehicle and performed remotely.

In one aspect, a method for controlling a vehicle includes determining, by a processor, a first driving pattern to control the vehicle in an autonomous mode. Sensor data is received from one or more sensors associated with the vehicle. The processor determines a second driving pattern based on the received sensor data and received user identification data. A user in a driver's seat of the vehicle is identified. The processor controls operation of the vehicle in the autonomous mode based on the identified user, the second pattern, and the first pattern.

In another aspect, a device for controlling a vehicle with an autonomous driving mode includes one or more sensors for detecting information surrounding the vehicle, a processor coupled to the one or more sensors, and a memory coupled to the processor and storing instructions executable by the processor causing the processor to: determine a first driving pattern to control the vehicle in an autonomous mode; receive user identification data; receive sensor data from one or more sensors associated with the vehicle; determine a second driving pattern based on the received sensor data and the received user identification data; identify a user in a driver's seat of the vehicle; and control operation of the vehicle in the autonomous mode based on the identified user, the second pattern, and the first pattern.

DETAILED DESCRIPTION

Aspects, features and advantages of the disclosure will be appreciated when considered with reference to the following description of exemplary embodiments and accompanying figures. The same reference numbers in different drawings may identify the same or similar elements. Furthermore, the following description is not limiting; the scope of the disclosure is defined by the appended claims and equivalents.

Figure 1:
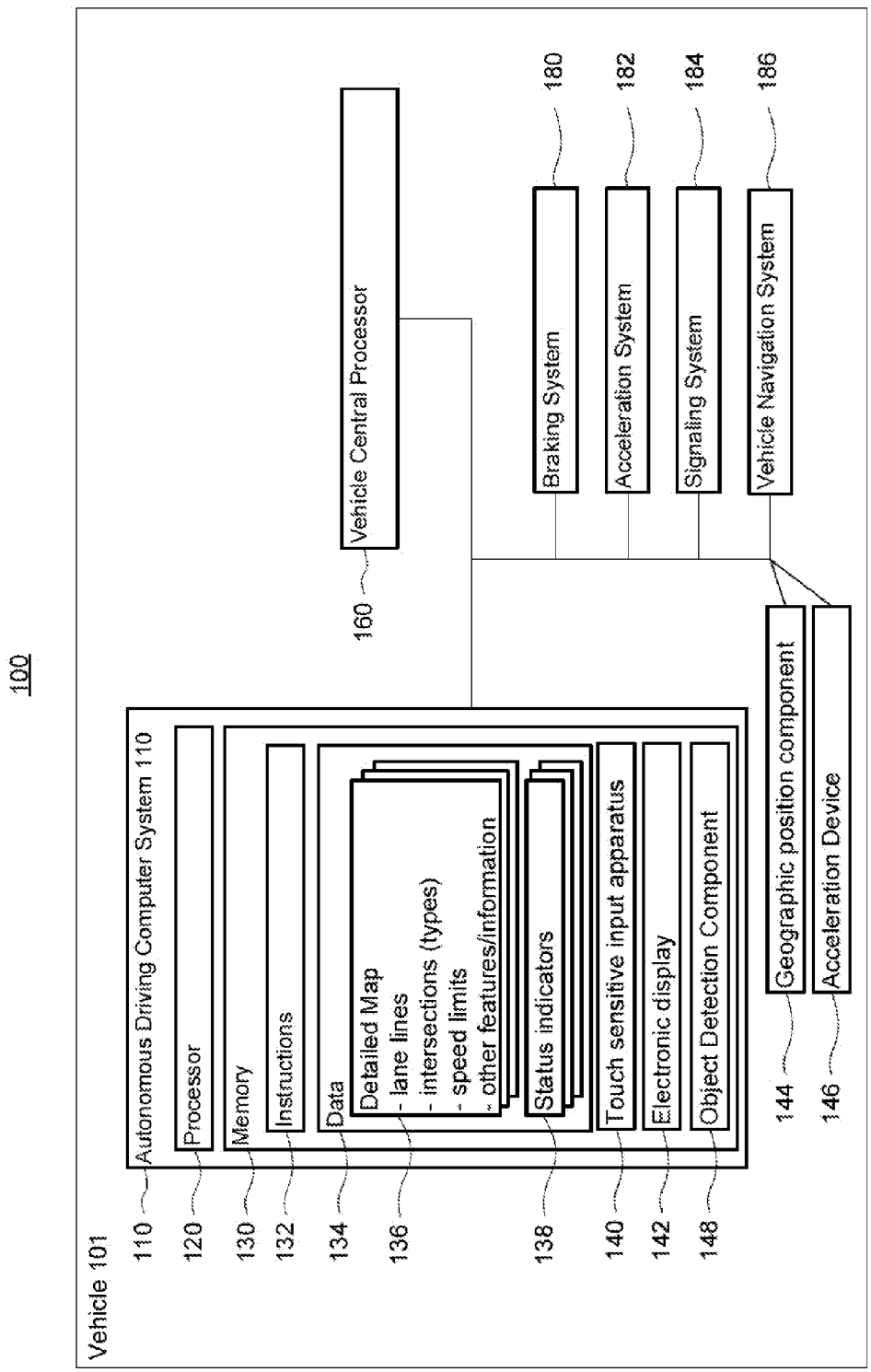
FIG. 1 is a functional diagram of a system in accordance with an exemplary embodiment.

As shown in FIG. 1, an autonomous driving system 100 in accordance with one aspect includes a vehicle 101 with various components. While certain aspects are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, construction vehicles, farm equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercial CPUs. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors, computers or memories that may or may not operate in parallel. Rather than using a single processor to perform the steps described herein some of the components such as steering components and deceleration components may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input (e.g., a mouse, keyboard, touch screen and/or microphone), as well as various sensors (e.g. a video camera) for gathering the explicit (e.g., a gesture) or implicit (e.g., "the person is asleep") information about the states and desires of a person.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertia-aided GPS, or camera-based localization may also be used to identify the location of the vehicle. The vehicle may also receive location information from various sources and combine this information using various filters to identify a "best" estimate of the vehicle's location. For example, the vehicle may identify a number of location estimates including a map location, a GPS location, and an estimation of the vehicle's current location based on its change over time from a previous location. This information may be combined together to identify a highly accurate estimate of the vehicle's location. The "location" of the vehicle as discussed herein may include an absolute geographical location, such as latitude, longitude, and altitude as well as relative location information, such as location relative to other cars in the vicinity which can often be determined with less noise than absolute geographical location.

The device may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front wheels).

The vehicle may include components 148 for detecting objects external to the vehicle such as other vehicles, obstacles in the roadway, traffic signals, signs, trees, etc. The detection system may include lasers, sonar, radar, cameras or any other detection devices. For example, if the vehicle is a small passenger car, the car may include a laser mounted on the roof or other convenient location. In one aspect, the laser may measure the distance between the vehicle and the object surfaces facing the vehicle by spinning on its axis and changing its pitch. The laser may also be used to identify lane lines, for example, by distinguishing between the amount of light reflected or absorbed by the dark roadway and light lane lines. The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects which are captured by two or more cameras. These sensors allow the vehicle to understand and potentially respond to its environment in order to maximize safety for passengers as well as objects or people in the environment.

In addition to the sensors described above, the computer may also use input from sensors typical of non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time; that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

These sensors may be used to identify, track and predict the movements of pedestrians, bicycles, other vehicles, or objects in the roadway. For example, the sensors may provide the location and shape information of objects surrounding the vehicle to computer 110, which in turn may identify the object as another vehicle. The object's current movement may be also be determined by the sensor (e.g., the component is a self-contained speed radar detector), or by the computer 110, based on information provided by the sensors (e.g., by comparing changes in the object's position data over time).

The computer may change the vehicle's current path and speed based on the presence of detected objects. For example, the vehicle may automatically slow down if its current speed is 50 mph and it detects, by using its cameras and using optical-character recognition, that it will shortly pass a sign indicating that the speed limit is 35 mph. Similarly, if the computer determines that an object is obstructing the intended path of the vehicle, it may maneuver the vehicle around the obstruction.

The vehicle's computer system may predict a detected object's expected movement. The computer system 110 may simply predict the object's future movement based solely on the object's instant direction, acceleration/deceleration and velocity, e.g., that the object's current direction and movement will continue.

Once an object is detected, the system may determine the type of the object, for example, a traffic cone, person, car, truck or bicycle, and use this information to predict the object's future behavior. For example, the vehicle may determine an object's type based on one or more of the shape of the object as determined by a laser, the size and speed of the object based on radar, or by pattern matching based on camera images. Objects may also be identified by using an object classifier which may consider one or more of the size of an object (bicycles are larger than a breadbox and smaller than a car), the speed of the object (bicycles do not tend to go faster than 40 miles per hour or slower than 0.1 miles per hour), the heat coming from the bicycle (bicycles tend to have a rider that emits body heat), etc.

In some examples, objects identified by the vehicle may not actually require the vehicle to alter its course. For example, during a sandstorm, the vehicle may detect the sand as one or more objects, but need not alter its trajectory, though it may slow or stop itself for safety reasons.

In another example, the scene external to the vehicle need not be segmented from input of the various sensors, nor do objects need to be classified for the vehicle to take a responsive action. Rather, the vehicle may take one or more actions based on the color and/or shape of an object.

The system may also rely on information that is independent of the detected object's movement to predict the object's next action. By way of example, if the vehicle determines that another object is a bicycle that is beginning to ascend a steep hill in front of the vehicle, the computer may predict that the bicycle will soon slow down—and will slow the vehicle down accordingly—regardless of whether the bicycle is currently traveling at a relatively high speed.

It will be understood that the foregoing methods of identifying, classifying, and reacting to objects external to the vehicle may be used alone or in any combination in order to increase the likelihood of avoiding a collision.

By way of further example, the system may determine that an object near the vehicle is another car in a turn-only lane (e.g., by analyzing image data that captures the other car, the lane the other car is in, and a painted left-turn arrow in the lane). In that regard, the system may predict that the other car may turn at the next intersection.

The computer may cause the vehicle to take particular actions in response to the predicted actions of the surrounding objects. For example, if the computer 110 determines that another car approaching the vehicle is turning, for example based on the car's turn signal or in which lane the car is, at the next intersection as noted above, the computer may slow the vehicle down as it approaches the intersection. In this regard, the predicted behavior of other objects is based not only on the type of object and its current trajectory, but also based on some likelihood that the object may or may not obey traffic rules or pre-determined behaviors. This may allow the vehicle not only to respond to legal and predictable behaviors, but also correct for unexpected behaviors by other drivers, such as illegal u-turns or lane changes, running red lights, etc.

In another example, the system may include a library of rules about object performance in various situations. For example, a car in a left-most lane that has a left-turn arrow mounted on the light will very likely turn left when the arrow turns green. The library may be built manually, or by the vehicle's observation of other vehicles (autonomous or not) on the roadway. The library may begin as a human-built set of rules which may be improved by vehicle observations. Similarly, the library may begin as rules learned from vehicle observation and have humans examine the rules and improve them manually. This observation and learning may be accomplished by, for example, tools and techniques of machine learning.

In addition to processing data provided by the various sensors, the computer may rely on environmental data that was obtained at a previous point in time and is expected to persist regardless of the vehicle's presence in the environment. For example, data 134 may include detailed map information 136, for example, highly detailed maps identifying the shape and elevation of roadways, lane lines, intersections, crosswalks, speed limits, traffic signals, buildings, signs, real time traffic information, or other such objects and information. Each of these objects such as lane lines or intersections may be associated with a geographic location which is highly accurate, for example, to 15 cm or even 1 cm. The map information may also include, for example, explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

In another example, the vehicle may use the map information to supplement the sensor data in order to better identify the location, attributes, and state of the roadway. For example, if the lane lines of the roadway have disappeared through wear, the vehicle may anticipate the location of the lane lines based on the map information rather than relying only on the sensor data.

The vehicle sensors may also be used to collect and supplement map information. For example, the driver may drive the vehicle in a non-autonomous mode in order to detect and store various types of map information, such as the location of roadways, lane lines, intersections, traffic signals, etc. Later, the vehicle may use the stored information to maneuver the vehicle. In another example, if the vehicle detects or observes environmental changes, such as a bridge moving a few centimeters over time, a new traffic pattern at an intersection, or if the roadway has been paved and the lane lines have moved, this information may not only be detected by the vehicle and used to make various determination about how to maneuver the vehicle to avoid a collision, but may also be incorporated into the vehicle's map information. In some examples, the driver may optionally select to report the changed information to a central map database to be used by other autonomous vehicles by transmitting wirelessly to a remote server. In response, the server may update the database and make any changes available to other autonomous vehicles, for example, by transmitting the information automatically or by making available downloadable updates. Thus, environmental changes may be updated to a large number of vehicles from the remote server.

In another example, autonomous vehicles may be equipped with cameras for capturing street level images of roadways or objects along roadways.

Figure 2:
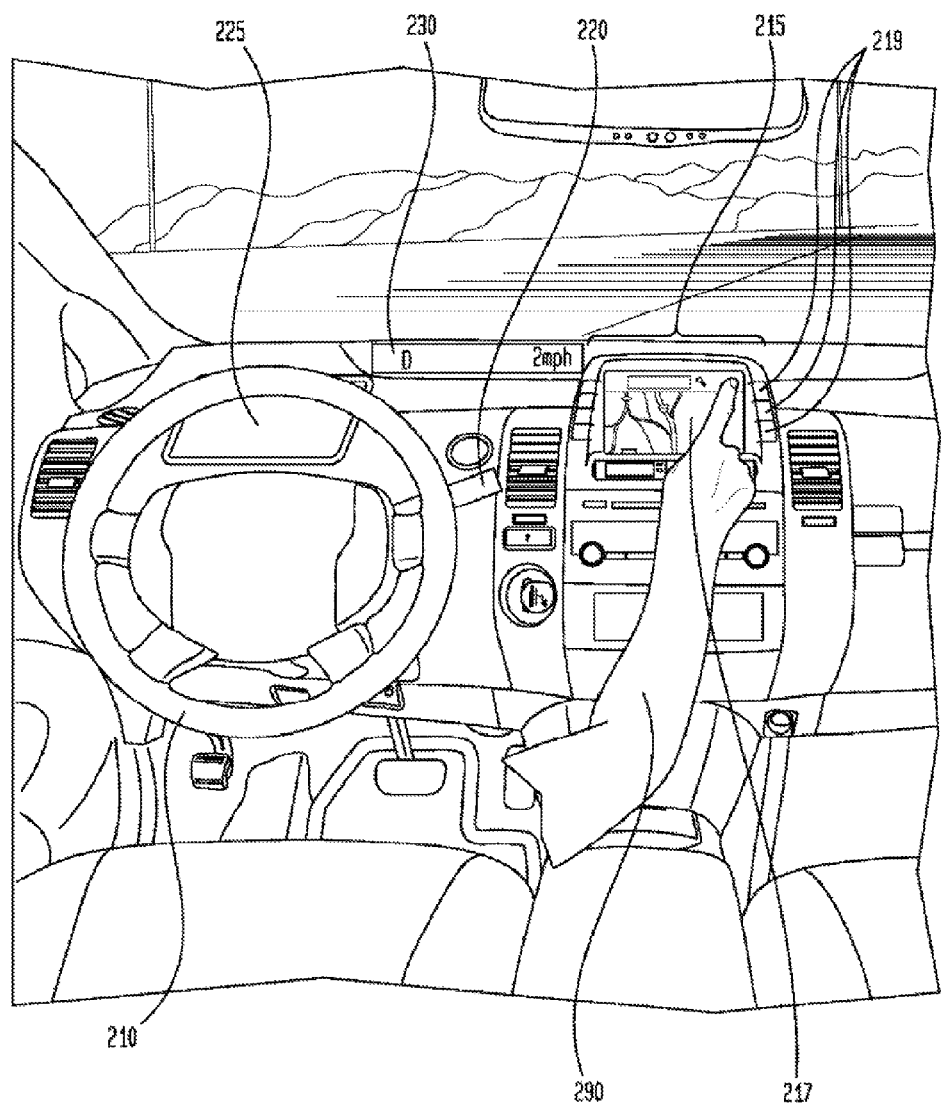
FIG. 2 is an interior of an autonomous vehicle in accordance with an exemplary embodiment.

Computer 110 may also control status indicators 138, in order to convey the status of the vehicle and its components to a passenger of vehicle 101. For example, vehicle 101 may be equipped with a display 225, as shown in FIG. 2, for displaying information relating to the overall status of the vehicle, particular sensors, or computer 110 in particular. The display 225 may include computer generated images of the vehicle's surroundings including, for example, the status of the computer, the vehicle itself, roadways, intersections, as well as other objects and information.

Computer 110 may use visual or audible cues to indicate whether computer 110 is obtaining valid data from the various sensors, whether the computer is partially or completely controlling the direction or speed of the car or both, whether there are any errors, etc. Vehicle 101 may also include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, or provide various other types of indications. In addition, the computer may also have external indicators which indicate whether, at the moment, a human or an automated system is in control of the vehicle, that are readable by humans, other computers, or both.

In one example, computer 110 may be an autonomous driving computing system capable of communicating with various components of the vehicle. For example, computer 110 may be in communication with the vehicle's conventional central processor 160, and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220.

Vehicle 101 may include one or more user input devices that enable a user to provide information to the autonomous driving computer 110. For example, a user, such as passenger 290, may input a destination (e.g., 123 Oak Street) into the navigation system using touch screen 217 or button inputs 219. In another example, a user may input a destination by identifying the destination. In that regard, the computer system may extract the destination from a user's spoken command.

The vehicle may also have various user input devices for activating or deactivating one or more autonomous driving modes. In some examples, the driver may take control of the vehicle from the computer system by turning the steering wheel, or pressing the acceleration or deceleration pedals. The vehicle may further include a large emergency button that discontinues all or nearly all of the computer's decision-making control relating to the car's velocity or direction. In another example, the vehicle's shift knob may be used to activate, adjust, or deactivate the autonomous modes.

Computer 110 may include, or be capable of receiving information from, one or more touch sensitive input apparatuses 140. For example, computer 110 may receive input from a user input apparatus and use this information to determine whether a passenger is in contact with, such as by holding or bumping, a particular portion of vehicle 110. The touch sensitive input apparatuses may be any touch sensitive input device capable of identifying a force, for example a force-resistance tape may be calibrated to accept or identify a threshold pressure input (such as 10 grams of pressure) or a range of pressures (such as 5-20 grams of pressure).

These inputs may be understood by the computer as commands from the user to, for example, enter into or exit from one or more autonomous driving modes. For example, if the vehicle is being operated in an autonomous mode and the driver bumps the steering wheel, if the force is above the threshold input, the vehicle may exit an autonomous mode and enter a semi-autonomous mode where the driver has control of at least the steering.

The various systems described above may be used by the computer to operate the vehicle and maneuver from one location to another. For example, a user may enter destination information into a navigation system, either manually or audibly. The vehicle may determine its location within a few inches based on a combination of the GPS receiver data and the sensor data, as well as the detailed map information. In response, the navigation system may generate a route between the present location of the vehicle and the destination.

When the driver is ready to relinquish some level of control to the autonomous driving computer, the user may activate computer control. The computer may be activated, for example, by pressing a button or by manipulating a lever such as gear shifter 220. Rather than taking control immediately, the computer may scan the surroundings and determine whether there are any obstacles or objects in the immediate vicinity which may prohibit or reduce the ability of the vehicle to avoid a collision. In this regard, the computer may require that the driver continue controlling the vehicle manually or with some level of control (such as the steering or acceleration) before entering into a fully autonomous mode.

Once the vehicle is able to maneuver safely without the assistance of the driver, the vehicle may become fully autonomous and continue to the destination. The driver may continue to assist the vehicle by controlling, for example, steering or whether the vehicle changes lanes, or the driver may take control of the vehicle immediately in the event of an emergency.

The vehicle may continuously use the sensor data to identify objects, such as traffic signals, people, other vehicles, and other objects, in order to maneuver the vehicle to the destination and reduce the likelihood of a collision. The vehicle may use the map data to determine where traffic signals or other objects may appear and respond by, for example, signaling to turn or change lanes.

Once the vehicle has arrived at the destination, the vehicle may provide audible or visual cues to the driver. For example, by displaying "You have arrived" on one or more of the electronic displays.

Figure 3:
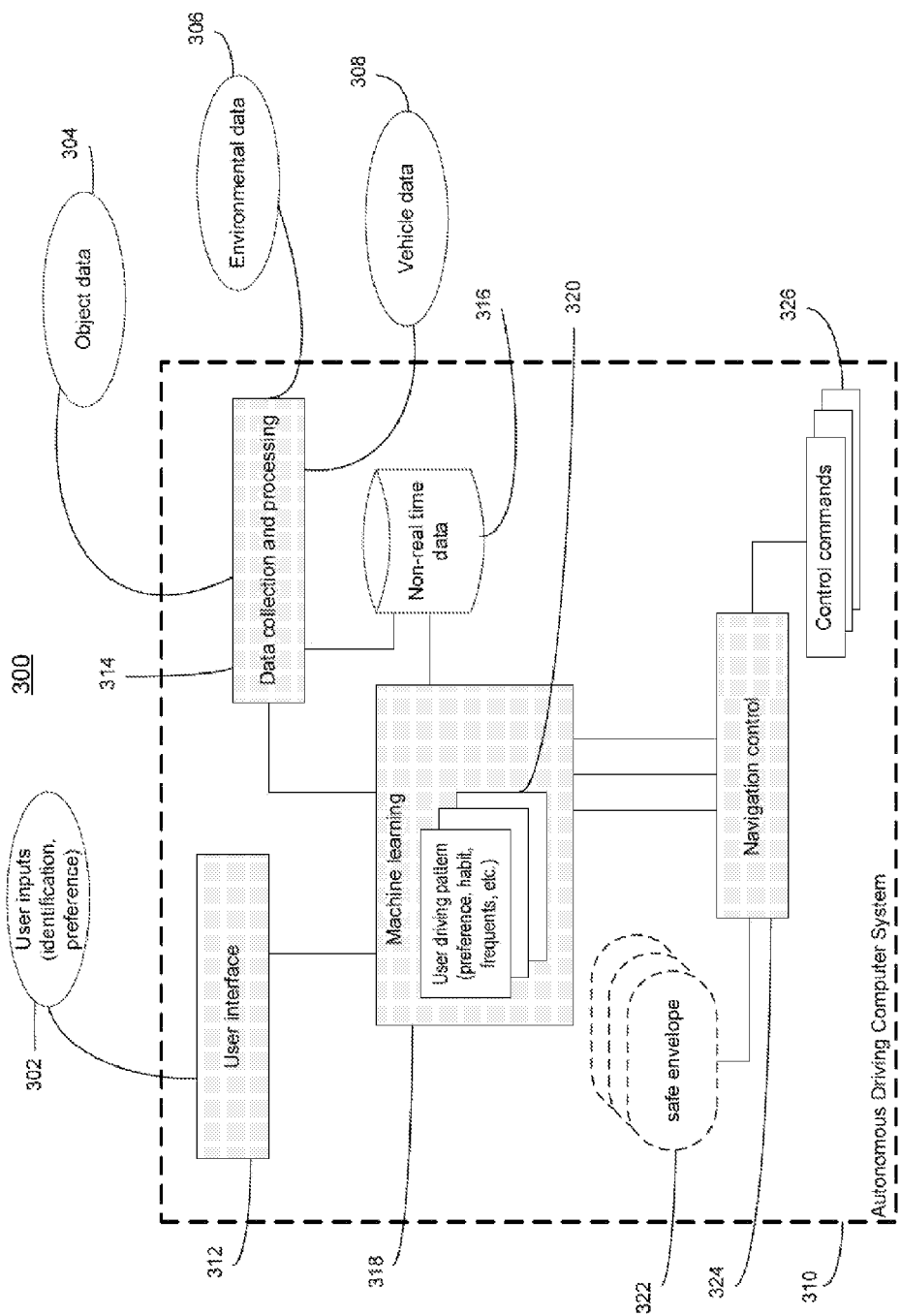
FIG. 3 is a system diagram of an autonomous vehicle driving system in accordance with an exemplary embodiment.

FIG. 3 illustrates an exemplary system diagram in accordance with aspects of the disclosure. As shown in scenario 300, the autonomous driving computer system 110 may continuously collect and utilize various types of real-time and non-real time data (such as data 302, 304, 306 and 308) to generate (by recording or deriving) user-specific driving patterns and perform autonomous controlling of the vehicle based on the generated user-specific driving patterns. For example, the autonomous driving computer system 110 may include a user interface system 312 to receive user input data 302. The user interface system 312 may be any kind of input device for a computer system, e.g., an electronic display such as a touch-screen, a keypad and/or microphone. As such, various prompts for user information may be displayed or otherwise communicated to the driver, and the driver may enter any desired input through the interface system 312. For example, user data input 302 may include user identification (e.g., the driver's name or a reference number) and/or other user attribute data such as gender and age. User input 302 may also include various user preference data such as preference for warning of any vehicle in an adjacent lane within a certain distance, making one or more specific stops along a route to a destination, etc.

The autonomous driving computer system 310 may also include a data collection and processing system 314, which may include various types of sensors and information gathering devices or systems as previously discussed for collecting object data 304, environmental data 306 and vehicle data 308. For example, system 314 may include radar, optical sensors, ultrasonic sensors, active and passive infrared sensors, radio frequency sensors, and cameras. System 314 may also include GPS and Assisted GPS systems to receive location signals, and communication systems such as wireless transmitters and receivers to communicate with remote servers or other types of information sources. The data collection and processing system 314 may also be external and connect to the computer system 310 directly, wirelessly or through various kinds of communication infrastructures available on the vehicle.

Object data 304 may include various types of moving or static objects within the sensors' respective sensing ranges. For example, object data 304 may include information about moving objects such as vehicles and pedestrians, and information about static objects such as roads, paths, lanes, buildings, signs, etc. The information may include relative velocity and distance to the autonomous vehicle, and other parameters for identifying and describing the objects.

Environmental data 306 may include information such as traffic conditions, weather conditions and road conditions etc. Environmental data 306 may be detected by the various types of sensors as described above or may be acquired through various communication devices from outside sources (e.g., servers providing weather, visibility or other types of driving condition information).

Vehicle data 308 may include various types of performance or operational data related to the vehicle, for example, brake/throttle applications, acceleration, velocity, wheel speed, lane changes, distances to the vehicles to the front and rear, tire pressure, suspension data, steering angles, engine temperature, gas usage, etc. Vehicle data 308 may also include vehicle location data and cargo loading data. Besides the external data, vehicle data 308 may also include other signals indicating the internal conditions of the vehicle, for example, weight measurements and distribution of the occupants (driver and passengers).

The autonomous vehicle may continuously monitor the vehicle and the objects moving in the vicinity of the vehicle, and collect the aforementioned data. Using such data collected over time, together with the user input data 302 and various types of non-real time data 316 (e.g., a detailed map) stored in the computer system, a machine learning system 318 is able to derive various driver preferences and generate driver specific patterns 320. For example, a particular driver's pattern may indicate a driver's preference of windy roads over straight roads, right turns over left turns, multi-lane highways over side roads, etc. In another example, a driver pattern may also include parameters generalizing how the driver normally changes lanes, enters onto or exits from a highway, starts from a traffic stop, and maintains or changes the space between vehicles in the front or to the rear.

From these patterns, the autonomous driving computer system may predict how a specific driver will drive. Various machine learning techniques and algorithms may be used to facilitate the learning process and driving predictions. For example, the vehicle may include a "record" button to put the vehicle into a training mode to record the actions of the driver. The driver may drive the vehicle for a day while the vehicle monitors how much torque is applied to the steering wheel, how quickly the driver accelerates at an interaction or highway, whether or not the driver selects to change lanes and pass slower vehicles, and how the driver applies the brakes. The vehicle may then learn the driver's preferred style and pattern, and replicate the pattern when the driver uses the vehicle in an autonomous mode.

The learning process may also record a specific route that the driver follows each day as well as the driver's style during the route. Then, the driver may select a "play" button and replay the route on the user display. Alternatively, the driver may select a "repeat trip" button, causing the vehicle to follow the same route making similar choices, though making alterations as necessary for safety, as the driver had done during the recording mode.

The learning period may depend on various factors such as the specific driving feature that the autonomous driving computer system 310 tries to learn. By way of example, the preference of multi-lane highways over side roads may take a longer time to learn than the preference of acceleration speed. As such, system 310 may adopt different combinations of machine learning algorithms with regard to different driving features.

Using the learned driving patterns, the vehicle may perform driver specific autonomous driving when it identifies which driver is currently in the driver's seat. The system may control the autonomous driving under the limits of the one or more safe envelope driving patterns 322. For instance, each autonomous vehicle may be configured with a set of default general safe envelope driving patterns that are applicable to all the drivers. The safe envelope driving patterns may be one or more sets of parameters limiting how a driver should drive, for example, by controlling the speed of changing lanes and the pattern of passing by vehicles, etc. The safe envelope patterns may also be set differently for different driver categories, or may be customized or adjusted by each individual driver. For example, the highest allowable speed on a highway or in making a turn may be set lower for users within a particular age group. In another example, certain routes may be disallowed under certain weather conditions in a safe envelope for a particular driver but allowed in another safe envelope for another driver.

As such, the autonomous vehicle may be driven under a set of driver-specific control commands 326, which may be generated by a navigation controller 324 based on both the safe envelopes 322 and the driver specific patterns 320. Thus, the autonomous vehicle is able to perform adaptive autonomous driving based on driver preferences but still safely within the general safe envelope driving patterns. For example, when the vehicle detects user A is the current driver, the control commands 326 may be generated to control the vehicle to change lanes more often in order to move faster for driver A than for driver B, but the overall speed and the frequency of changing lanes are all still within the safe envelope boundary. In another example, the autonomous vehicle may select a route with more windy roads for driver C and a route with more straight roads for driver D, but the selected routes are all allowable by the safe envelope or are not among the disallowed routes of the safe envelope. In a further example, the autonomous vehicle may follow closer to the vehicle in front for a driver E than for driver F, who is less aggressive than driver E, but still keep the distance to the vehicle in front above the minimum distance designated in the safe envelope.

The autonomous vehicle may also take various counter measures to ensure the driving is within the safe envelope. The countermeasures may include, but is not limited to, brake control, throttle control, steering control, transmission control and suspension control.

Operations in accordance with aspects of the disclosure will now be described with reference to FIGS. 4-5. It should be understood that the following operations do not have to be performed in the precise order described below. Rather, various operations can be handled in a different order or simultaneously. It should also be understood that these operations do not have to be performed all at once. For instance, some operations may be performed separately from other operations.

Figure 4:
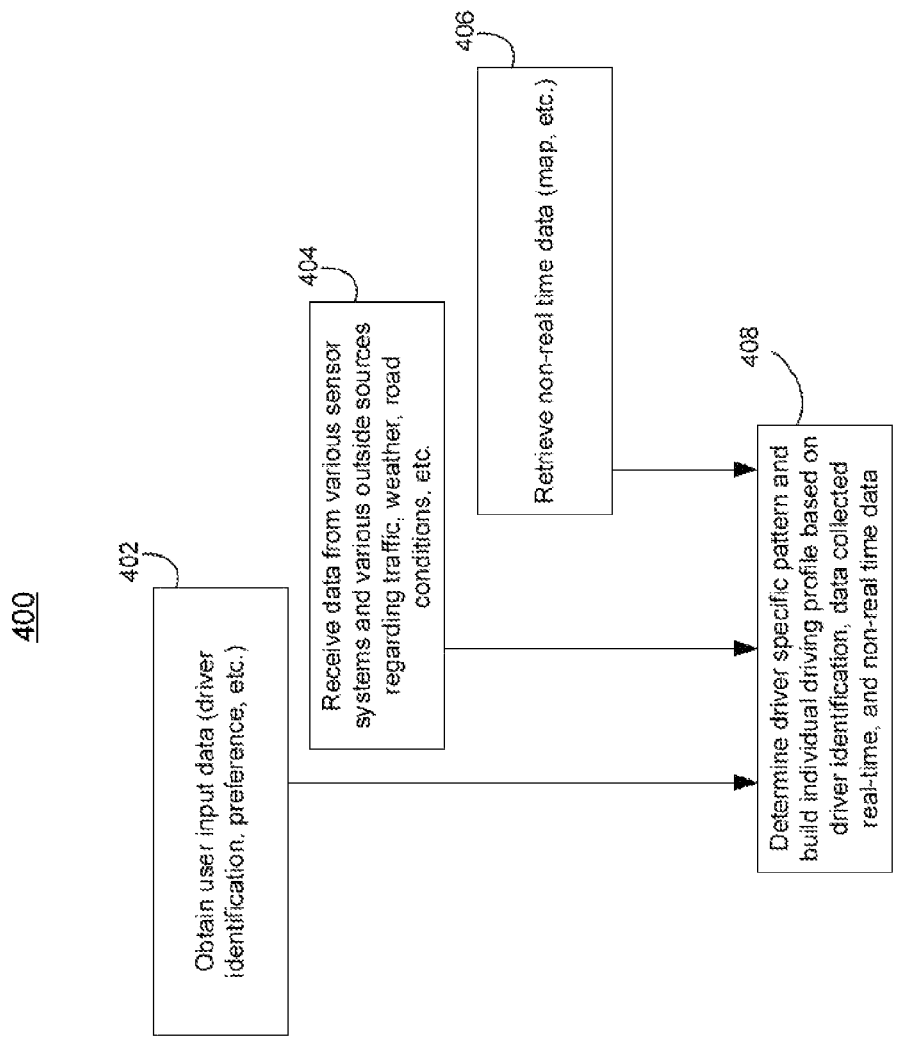
FIG. 4 is a flow diagram for management of an autonomous vehicle in accordance with an exemplary embodiment.

FIG. 4 illustrates a flow chart 400 where an autonomous vehicle collects data and builds user specific driving patterns. As shown in FIG. 4, the driving pattern recognition process 400 preferably starts in block 402 with the autonomous driving computer system obtaining user input data such as user identification, preferences and/or other information indicating a user's profile. A user's identification may include a user's name or a reference number. User preference data may include data indicating, for example, a preference for quicker acceleration, a preference for frequent stops along a route, or a preference for maintaining a speed at the legal speed limit. The autonomous driving computer system may also receive information indicating a user's profile, for example, experienced vs. inexperienced, and levels of risks or aggressiveness that the user is willing to accept.

The autonomous driving computer system may start, at the same time and in block 404, to continuously collect data from various sensor systems and outside sources regarding the vehicle's operations/conditions, objects in the vicinity of the vehicle, traffic, weather and road conditions. The data may be collected by, for example, GPS, inertial sensors, lasers, radar, sonar, and acoustic sensors. Other feedback signals, such as input from sensors typical of non-autonomous vehicles, may also be read from the vehicle. Example sensors typical of non-autonomous vehicles include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc. In block 406, the system may also retrieve various types of non-real time data (e.g., a detailed map) stored in the system or from the remote information sources.

In block 408, the autonomous driving computer system may determine one or more driver specific patterns based on the received user identification, the data collected in real time and the non-real time data. The system may also build profiles for each individual driver to facilitate storage of the data in local memory or remote storage and retrieval by authorized users. Each profile includes the driving patterns and other user-related information.

Figure 5:
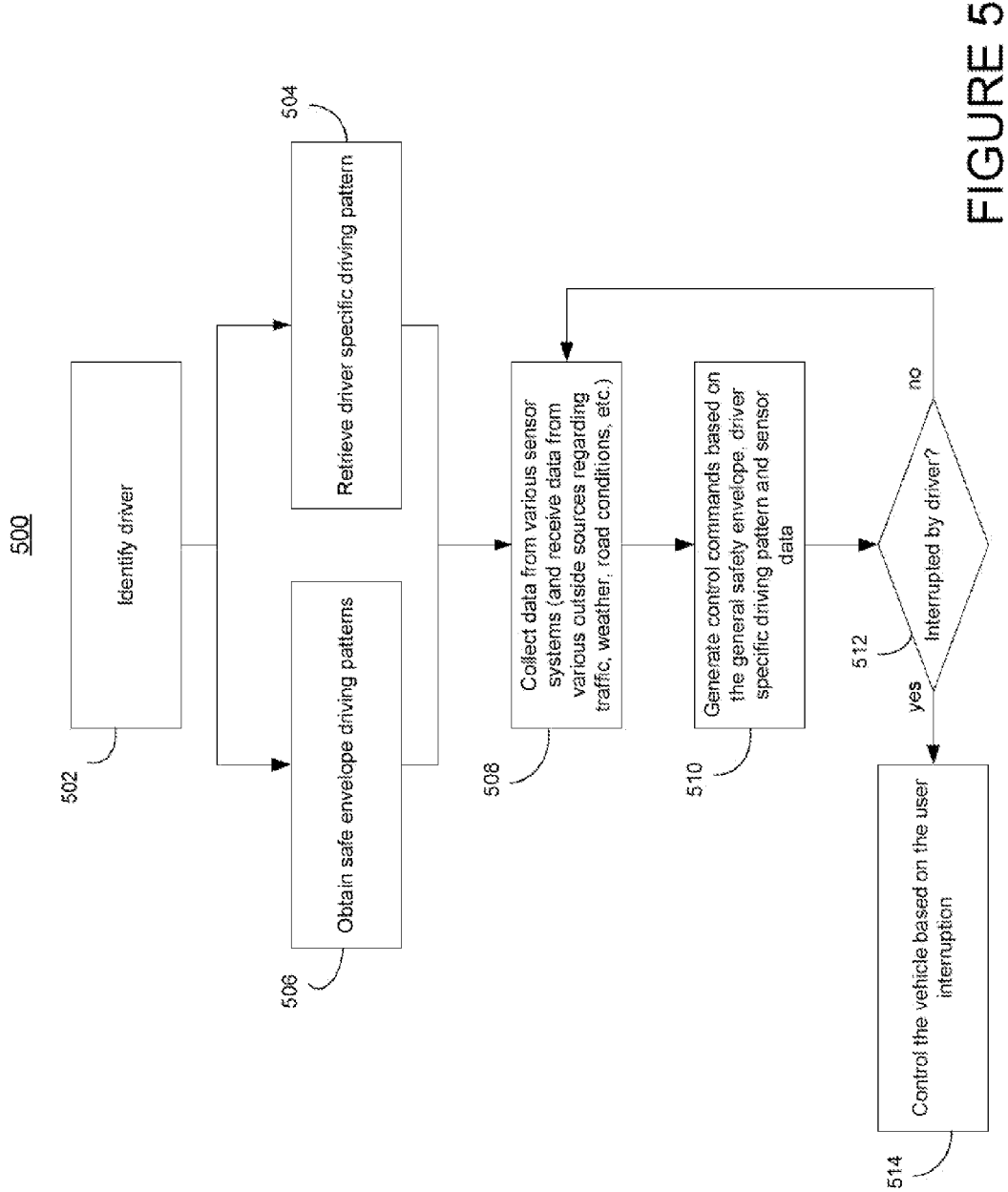
FIG. 5 is another flow diagram in accordance with an exemplary embodiment.

FIG. 5 illustrates a process 500 where the autonomous driving system operates the vehicle based on the driver-specific patterns. In block 502, the system identifies the user sitting in the driver's seat by, for example, the driver logging-in to the system or other typical user authentication techniques. In block 504, the system retrieves the driver-specific driving pattern based on the user's identification. In block 506, the system also obtains safe envelope driving patterns from local or remote memory. In block 508, the system collects data from various sensor systems about the operations and conditions of the vehicle, and the objects surrounding the vehicle. The system also receives other information such as traffic and weather information from other sources.

In block 510, the vehicle generates control commands based on the safe envelope driving patterns, the driver specific patterns and the data collected in block 508, and performs autonomous driving accordingly. In block 512, the autonomous driving computer system continually monitors whether the autonomous driving is interrupted by the driver. If autonomous driving is interrupted, the system starts to control the vehicle in response to the user interruption in block 514. Otherwise, the system continues collecting sensor data and controlling the vehicle in an autonomous mode.

Systems and methods according to aspects of the disclosure are not limited to detecting any particular type of objects or observing any specific type of vehicle operations or environmental conditions, nor limited to any particular machine learning algorithm, but may be used for deriving and learning any driving pattern with any unique signature to be differentiated from other driving patterns.

The sample values, types and configurations of data described and shown in the figures are for the purposes of illustration only. In that regard, systems and methods in accordance with aspects of the disclosure may include various types of sensors, communication devices, user interfaces, vehicle control systems, data values, data types and configurations. The systems and methods may be provided and received at different times (e.g., via different servers or databases) and by different entities (e.g., some values may be pre-suggested or provided from different sources).

As these and other variations and combinations of the features discussed above can be utilized without departing from the systems and methods as defined by the claims, the foregoing description of exemplary embodiments should be taken by way of illustration rather than by way of limitation of the disclosure as defined by the claims. It will also be understood that the provision of examples (as well as clauses phrased as "such as," "e.g.", "including" and the like) should not be interpreted as limiting the disclosure to the specific examples; rather, the examples are intended to illustrate only some of many possible aspects.

Unless expressly stated to the contrary, every feature in a given embodiment, alternative or example may be used in any other embodiment, alternative or example herein. For instance, any appropriate sensor for detecting vehicle movements may be employed in any configuration herein. Any data structure for representing a specific driver pattern or a signature vehicle movement may be employed. Any suitable machine learning algorithms may be used with any of the configurations herein.

The invention claimed is:

1. A method for controlling a vehicle, the method comprising:
   generating, by one or more processors, a driver specific profile by evaluating driver preferences over one or more driving trips in a manual driving mode;
   determining, by the one or more processors, a set of safe driving requirements to control the vehicle in an autonomous driving mode, the set of safe driving requirements defining a lane changing limit;
   controlling, by the one or more processors, the vehicle in the autonomous driving mode based on the driver specific profile and the lane changing limit of the set of safe driving requirements.

2. The method of claim 1, wherein the set of safe driving requirements indicates a minimum distance from the vehicle to a different vehicle positioned in front of the vehicle.

3. The method of claim 1, wherein the lane changing limit indicates a frequency of changing lanes.

4. The method of claim 1, wherein the lane changing limit indicates a speed for changing lanes.

5. The method of claim 1, wherein the lane changing limit indicates a pattern for passing by other vehicles.

6. The method of claim 1, wherein the driver specific profile indicates a particular driver preference for changing lanes in order to drive the vehicle faster, and wherein the lane changing limit is used to control the vehicle in the autonomous mode when the particular driver preference causes a conflict the set of safe driving requirements and the driver specific pattern.

7. The method of claim 1, further comprising controlling the vehicle according to the driver specific profile so long as an overall speed of the vehicle and a frequency of changing lanes are within the set of safe driving requirements.

8. A system for controlling a vehicle, the system comprising one or more processors configured to:
   generate a driver specific profile by evaluating driver preferences over one or more driving trips in a manual driving mode;
   determine a set of safe driving requirements to control the vehicle in an autonomous driving mode, the set of safe driving requirements defining a lane changing limit;
   control the vehicle in the autonomous driving mode based on the driver specific profile and the lane changing limit of the set of safe driving requirements.

9. The system of claim 8, wherein the set of safe driving requirements indicates a minimum distance from the vehicle to a different vehicle positioned in front of the vehicle.

10. The system of claim 8, wherein the lane changing limit indicates a frequency of changing lanes.

11. The system of claim 8, wherein the lane changing limit indicates a speed for changing lanes.

12. The system of claim 8, wherein the lane changing limit indicates a pattern for passing by other vehicles.

13. The system of claim 8, wherein the driver specific profile indicates a particular driver preference for changing lanes in order to drive the vehicle faster, and the one or more processors are further configured to use the lane changing limit to control the vehicle in the autonomous mode when the particular driver preference causes a conflict the set of safe driving requirements and the driver specific pattern.

14. The system of claim 8, wherein the one or more processors are further configured to control the vehicle according to the driver specific profile so long as an overall speed of the vehicle and a frequency of changing lanes are within the set of safe driving requirements.

15. A non-transitory computer-readable storage medium on which instructions are stored, the instructions, when executed by one or more processors cause the one or more processors to perform a method for controlling a vehicle, the method comprising:
   generating a driver specific profile by evaluating driver preferences over one or more driving trips in a manual driving mode;
   determining a set of safe driving requirements to control the vehicle in an autonomous driving mode, the set of safe driving requirements defining a lane changing limit;
   controlling the vehicle in the autonomous driving mode based on the driver specific profile and the lane changing limit of the set of safe driving requirements.

16. The medium of claim 15, wherein the set of safe driving requirements indicates a minimum distance from the vehicle to a different vehicle positioned in front of the vehicle.

17. The medium of claim 15, wherein the lane changing limit indicates a frequency of changing lanes.

18. The medium of claim 15, wherein the lane changing limit indicates a speed for changing lanes.

19. The medium of claim 15, wherein the lane changing limit indicates a pattern for passing by other vehicles.

20. The medium of claim 15, wherein the method further comprises controlling the vehicle according to the driver specific profile so long as an overall speed of the vehicle and a frequency of changing lanes are within the set of safe driving requirements.

* * * * *